(12) United States Patent
Harrison

(10) Patent No.: US 7,661,755 B2
(45) Date of Patent: Feb. 16, 2010

(54) FLATBED TRAILER SIDEWALL PANELS

(75) Inventor: Michael R. Harrison, Tallmadge, OH (US)

(73) Assignee: Hapco Inc., Kent, OH (US)

( * ) Notice: Subject to any disclaimer, the term of this patent is extended or adjusted under 35 U.S.C. 154(b) by 0 days.

(21) Appl. No.: 12/217,887

(22) Filed: Jul. 10, 2008

(65) Prior Publication Data

US 2010/0007173 A1    Jan. 14, 2010

(51) Int. Cl.
*B62D 33/033*    (2006.01)
(52) U.S. Cl. ............... 296/186.1; 296/186.2; 296/186.5
(58) Field of Classification Search ............. 296/186.1, 296/186.2, 186.5, 98, 182.1, 191, 104; 52/79.9, 52/273; 160/19, 47, 50, 76, 83.1, 85, 113, 160/182, 184, 229.1, 371, 378
See application file for complete search history.

(56) References Cited

U.S. PATENT DOCUMENTS

| | | | | | |
|---|---|---|---|---|---|
| 3,126,224 | A | * | 3/1964 | Carter, Jr. et al. | 296/186.5 |
| 3,971,590 | A | * | 7/1976 | Yglesias | 296/104 |
| 4,309,054 | A | | 1/1982 | Allen | 296/36 |
| 4,453,761 | A | * | 6/1984 | Felburn | 296/43 |
| 5,180,203 | A | * | 1/1993 | Goudy | 296/98 |
| 5,320,396 | A | | 6/1994 | Petelka | 296/43 |
| 5,466,030 | A | * | 11/1995 | Harris et al. | 296/98 |
| 5,658,037 | A | * | 8/1997 | Evans et al. | 296/98 |
| 5,664,824 | A | * | 9/1997 | Stephens et al. | 296/100.17 |
| 5,911,467 | A | * | 6/1999 | Evans et al. | 296/186.2 |
| 6,196,786 | B1 | * | 3/2001 | Shinohara | 414/498 |
| 6,478,361 | B1 | * | 11/2002 | Wood | 296/98 |
| 6,832,809 | B2 | * | 12/2004 | Wang et al. | 296/186.5 |
| 7,252,317 | B2 | * | 8/2007 | Boe | 296/43 |
| 7,350,842 | B2 | * | 4/2008 | LeBlanc et al. | 296/43 |
| 7,399,038 | B2 | * | 7/2008 | Vandewinckel et al. | 298/1 C |
| 7,520,558 | B2 | * | 4/2009 | Conny et al. | 296/185.1 |
| 2006/0208533 | A1 | * | 9/2006 | Bowling | 296/186.2 |
| 2008/0054679 | A1 | * | 3/2008 | Bowling | 296/186.2 |

FOREIGN PATENT DOCUMENTS

WO    WO91/14593    * 10/1991    ............ 296/141

* cited by examiner

*Primary Examiner*—Glenn Dayoan
*Assistant Examiner*—Gregory Blankenship
(74) *Attorney, Agent, or Firm*—Renner, Kenner, Greive, Bobak, Taylor & Weber

(57) ABSTRACT

A wall panel for use in a flatbed trailer sidewall system includes a frame and a waterproof fabric sheet. The frame may include a bore therein to receive an enlarged edge profile of the fabric sheet. The frame of the wall panel is generally rectangular in shape and consists of a top rail, a bottom rail, and two opposing side rails extending between the top rail and bottom rail. The rails may be secured to one another using one or both of a corner bracket and a threaded insert and threaded fastener assembly.

14 Claims, 7 Drawing Sheets

FLATBED TRAILER SIDEWALL PANELS

TECHNICAL FIELD

This invention relates to sidewalls for flatbed trailers. More specifically, this invention relates to lightweight sidewalls for flatbed trailers having a frame and a fabric sheet.

BACKGROUND ART

Flatbed trailers are widely used in the trucking industry due, at least in part, to their versatility. The flatbed trailer may be used to haul cargo that does not fit within an enclosed trailer, and it also makes loading some cargo easier, even if that cargo would fit in an enclosed trailer. Frequently, however, it is necessary to provide protection for cargo being hauled by a flatbed trailer to prevent damage from water, wind, and debris. In these instances, flatbed trailers can be converted to enclosed trailers by the use of a temporary sidewall and roof system, transforming the trailer into what is commonly known as a "covered wagon." These covered wagon systems are well known in the art.

Sidewalls of a covered wagon type trailer typically consist of vertical T-stakes that slide into pockets provided in the trailer and wall panels that fit between retaining members on the T-stakes and rest on the trailer surface. The T-stakes may include a recess to receive an arched member which extends transversely across the width of the trailer. A tarp may then be secured over the arched members to create a roof, thereby creating a substantially waterproof inner area for hauling cargo. In this way the flatbed trailer may be converted to an enclosed trailer so that any type of cargo can be hauled without risk of damaging or losing the cargo.

The wall panels of the covered wagon sidewalls have conventionally been made from one of two materials, either plywood, or, in other cases, a polystyrene material having a fiberglass exterior face. Wall panels made of these materials suffer from a number of disadvantages. The plywood wall panels are extremely heavy, which is of great concern to truck drivers who use the wall systems. The heavy walls increase the weight of the trailer, which may not only reduce the weight of cargo which may be hauled, but also negatively impacts fuel consumption. Even a small increase in weight being pulled by a truck can significantly affect the amount of fuel used. Polystyrene panels, while lighter, suffer from their own disadvantages. These panels are more susceptible to warping due to temperature and humidity changes, are less durable and difficult to repair if damaged, and are available in a very limited number of colors.

In view of these problems, it is evident that the need exists for a wall panel system that is lighter, easier to repair, resilient to all types of weather conditions, and available in a wider selection of colors and designs.

DISCLOSURE OF THE INVENTION

It is thus an object of one aspect of the present invention to provide wall panels for a flatbed trailer sidewall system that are relatively light in weight.

It is an object of a further aspect of the present invention to provide wall panels for a flatbed trailer sidewall system, as above, that are easy to repair.

It is an object of an additional aspect of the present invention to provide wall panels for a flatbed trailer sidewall system, as above, that are durable and resilient.

It is an object of another aspect of the present invention to provide wall panels for a flatbed trailer sidewall system, as above, that can be readily available in many colors and designs.

These and other objects of the present invention, as well as the advantages thereof over existing prior art forms, which will become apparent from the description to follow, are accomplished by the improvements hereinafter described and claimed.

In general, a wall panel made in accordance with the present invention for use in a flatbed trailer sidewall includes a frame and a waterproof fabric sheet carried by said frame.

In accordance with another aspect of the present invention, a wall panel system includes a frame having a top rail, a bottom rail, and two opposing side rails. The rails intersect each other to create a generally rectangular shaped frame having four corners. A waterproof fabric sheet is provided within the frame, and has an enlarged edge profile secured in a bore in each rail of the frame.

In accordance with another aspect of the present invention, a wall panel system for use on a flatbed trailer having pockets around the perimeter of the bed includes a plurality of T-stakes adapted to be positioned vertically in the pockets of the trailer bed. Wall panels are adapted to be positioned between the T-stakes. The wall panels include a frame and a fabric sheet secured in the frame.

A preferred exemplary flatbed trailer wall panel system according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
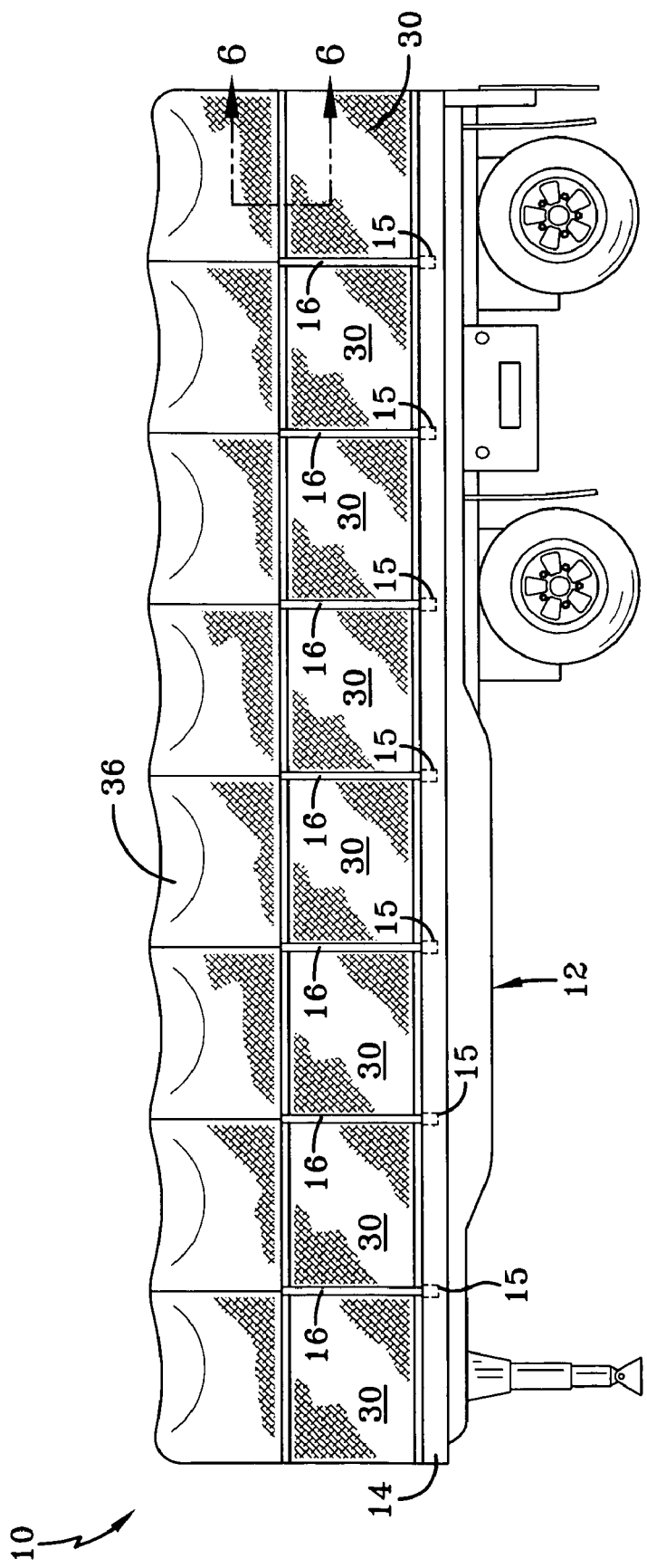
FIG. 1 is a side elevational view of a flatbed trailer having a sidewall and roofing system according to the concepts of the present invention installed thereon.

A sidewall and roofing system made in accordance with the present invention is indicated generally by the numeral 10 and is shown in FIG. 1 installed on a flatbed trailer 12. Flatbed trailer 12, of which there are a variety of sizes and weight capacities available, may be conventionally constructed and adapted to be pulled by a truck. These flatbed trailers may include pockets 15 on the trailer bed 14 to receive T-stakes 16 therein. The pockets 15 may vary in size and in spacing around the edge of bed 14, but are typically spaced approximately twenty-four inches apart with a width of between approximately 1.50 inches and 1.75 inches and a length of between approximately 2.80 inches and 3.50 inches. T-stakes 16 may include an enlarged end designed to fit snugly within the pockets 15 in trailer bed 14, and may also include an outwardly extending flange adapted to rest on bed 14 around the perimeter of the pockets to help support the weight of the T-stake 16 and to provide additional support. T-stakes 16 may be positioned within every pocket 15 of flatbed trailer 12, or, as is more likely, T-stakes 16 may be positioned within every-other pocket 15 around flatbed trailer 12 to allow for an approximately four foot wide space therebetween.

Figure 2:
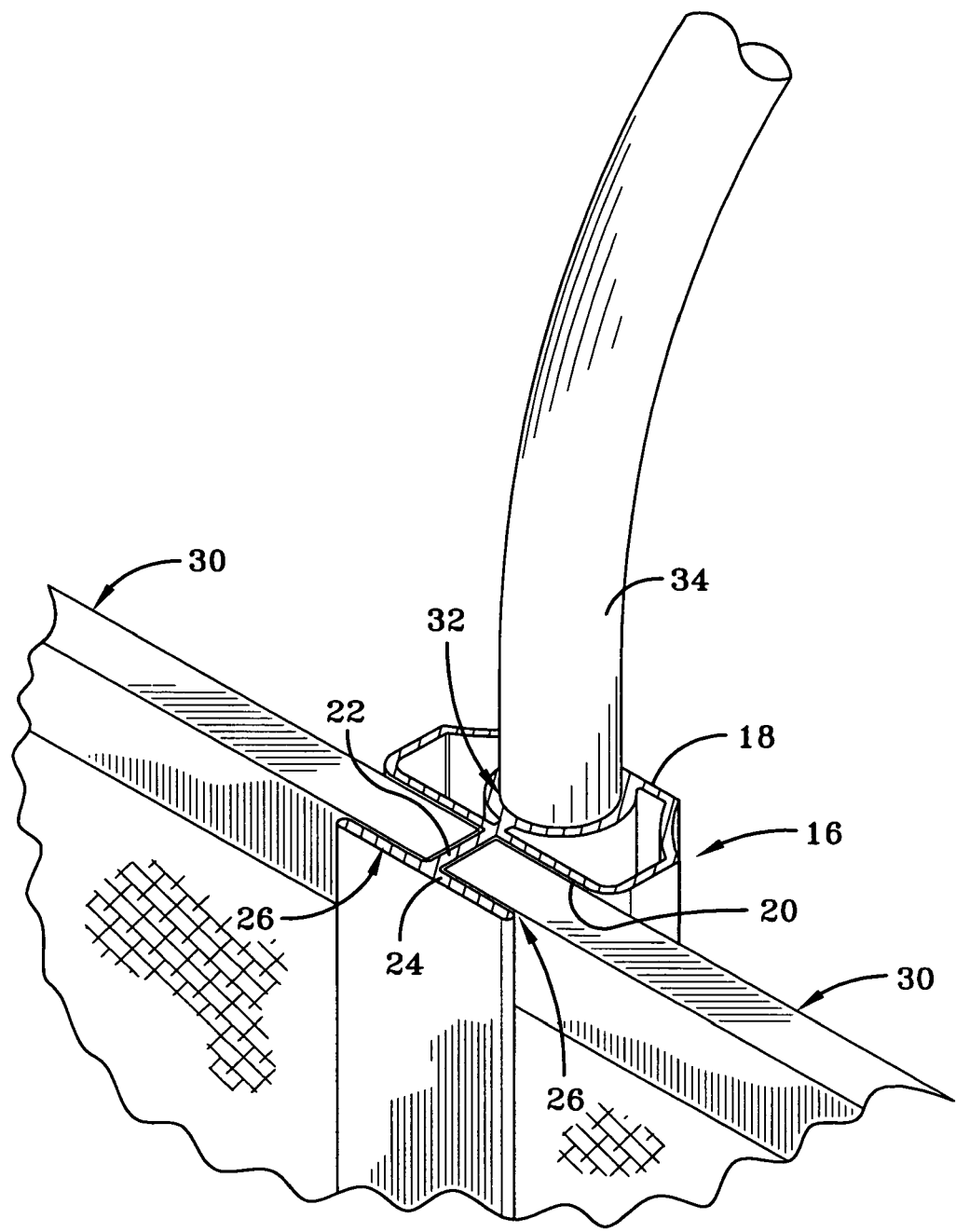
FIG. 2 is a fragmentary perspective view of an arch member and the wall panel of the sidewall system.
Figure 3:
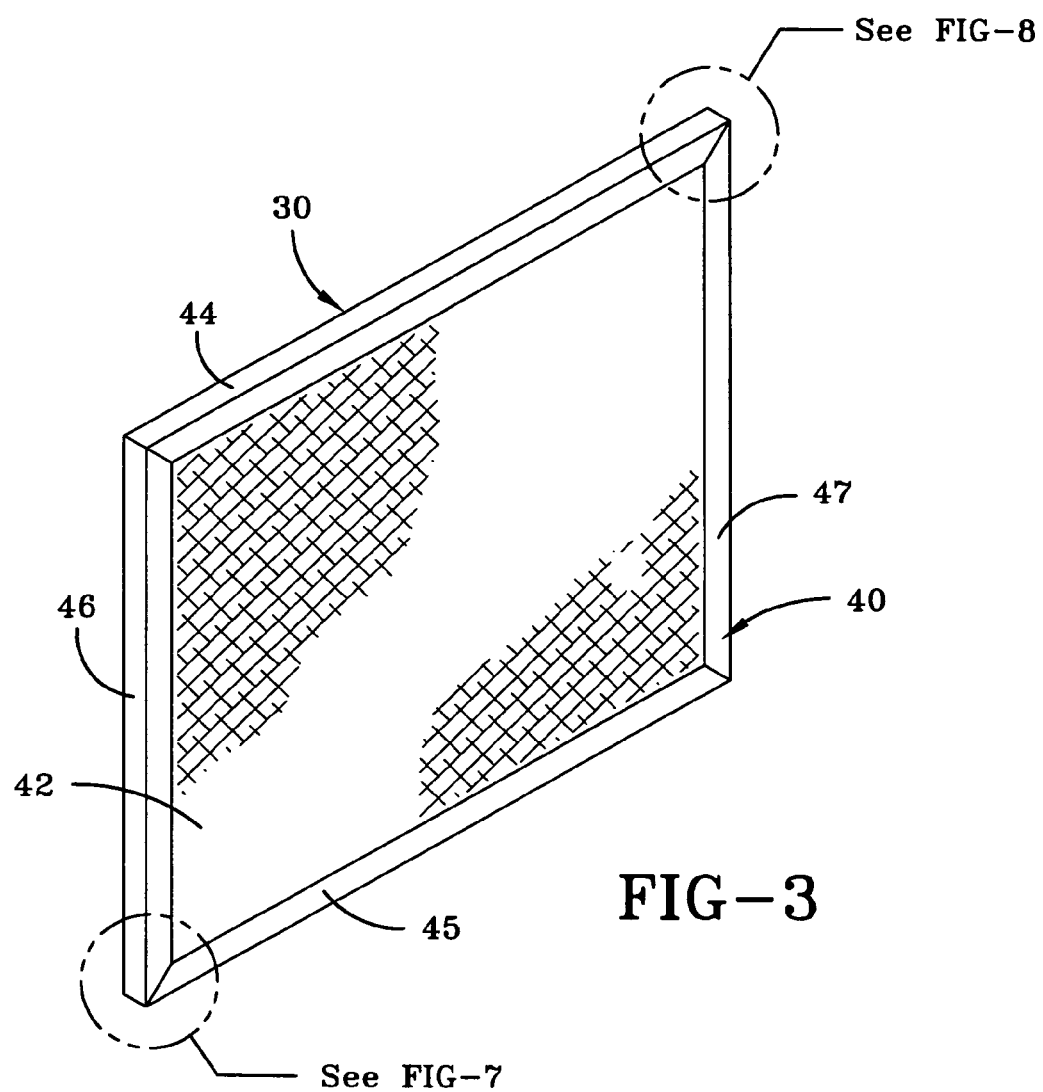
FIG. 3 is a perspective view of a wall panel according to the concepts of the present invention.

T-stakes 16 are well known in the art of flatbed trailer sidewall systems, are available in a number of various sizes and designs, and may be made from any number of suitable materials known to persons having ordinary skill in the art. The T-stake 16 shown in FIG. 2 includes a post 18 having a flat surface 20. A protruding element 22 extends substantially perpendicularly from post 18 at approximately the center of flat surface 20. A retaining flange 24 is positioned substantially perpendicular to protruding element 22, and is positioned approximately centered over protruding element 22. As can be seen, two slots 26 are created, one on either side of protruding element 22. Slots 26 receive wall panels 30 therein and act to secure them in place, with a bottom surface of wall panels 30 resting on bed 14 of flatbed trailer 12. T-stakes 16 also include a generally circular recess 32 in the top portion of post 18 adapted to receive an arched member 34 that extends transversely across trailer bed 14 and is received at its opposite end in another T-stake 16. Arched member 34 acts to support a roof tarpaulin 36 that covers and protects the contents of flatbed trailer 12.

Wall panel 30 includes a frame 40 and a fabric sheet 42 that is received in frame 40, and secured therein around its periphery. Frame 30 is generally rectangular in shape, having a top rail 44, a bottom rail 45, and opposing side rails 46, 47 extending between top rail 44 and bottom rail 45. The frame rails intersect at approximately right angles, and have angled ends so as to fit snugly together, as is well known. Frame 40 may be made of any suitable materials known to persons skilled in the art, such as, for example, wood, composite materials, and metals. The rails 44-47 of frame 40 are preferably made of extruded aluminum, which has good strength characteristics, yet is relatively light weight.

Figure 4:
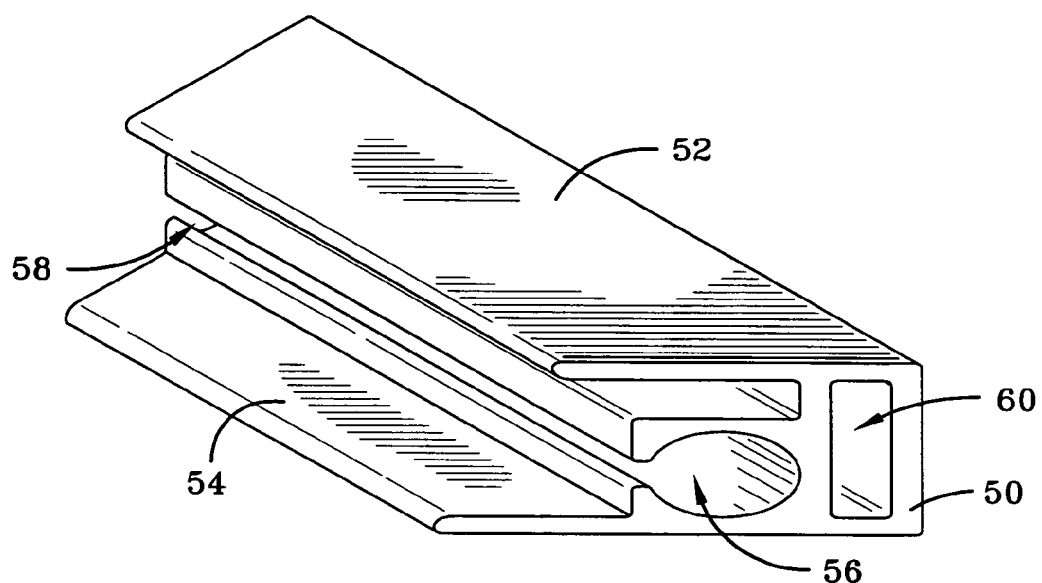
FIG. 4 is a perspective view of a frame rail of the wall panel of the present invention.
Figure 5:
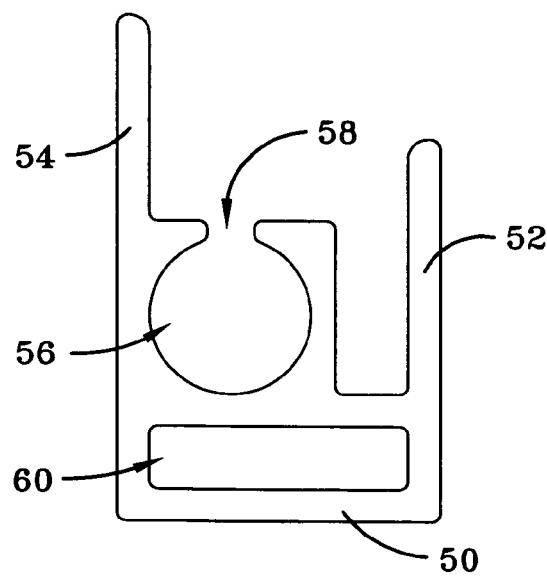
FIG. 5 is an end elevational view of the frame rail of FIG. 4.

Rails 44-47 may all have an identical shape and profile, as best seen in FIGS. 4 and 5. The rails include a base plate 50, a first arm 52 extending orthogonally from an edge of the base plate, and a second arm 54 extending orthogonally from the opposite edge of the base plate 50. The rails also include a bore 56 extending longitudinally therethrough, bore 56 having an opening 58 on a side opposite base plate 50 such that it is facing the middle of wall panel 30. Rails 44-47 also include a slot 60, located at least at the ends thereof, but which may extend the entire length of the rail.

Fabric sheet 42 may be made of any weatherproof and water resistant material, such as those conventionally used to make tarpaulins or other protective covers, including, for example, vinyl coated nylon, canvas, and the like. These fabric sheets are available in a wide variety of colors and designs, offering greater flexibility in manufacturing. Fabric sheet 42 preferably has some ability to allow light to pass therethrough so that, when wall panels 30 are installed, the interior area of flatbed trailer 12 created by the sidewall and roofing system is provided with at least some light.

Figure 6:
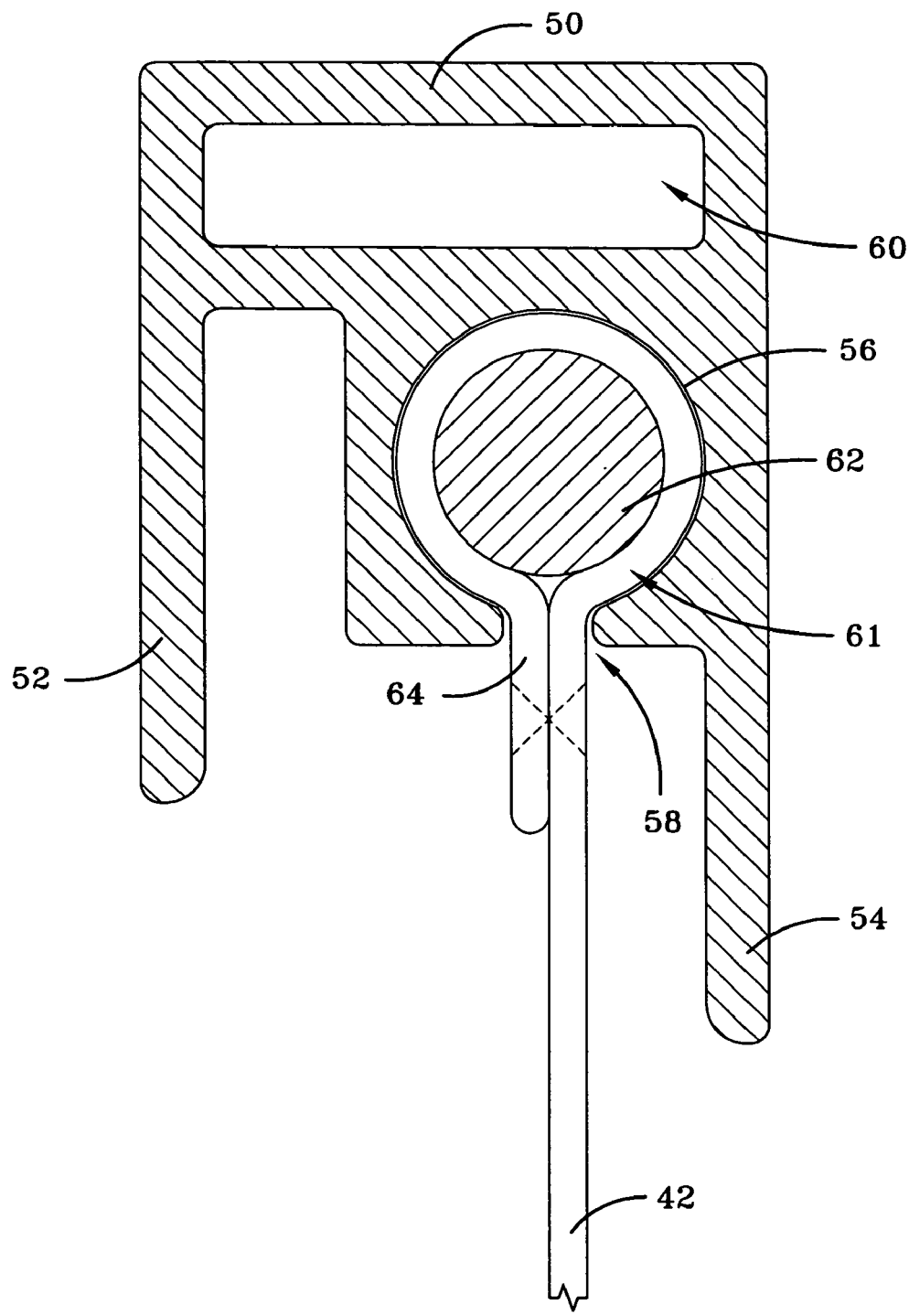
FIG. 6 is a sectional view of a portion of the wall panel taken substantially along line 6-6 of FIG. 1.

Fabric sheet 42 is received in and secured to frame 40 by an attachment means, which may include any known mechanism for securing fabric sheet 42 to rails 44-47. As best seen in FIG. 6, in one form of attachment, fabric sheet 42 is provided with an enlarged edge profile 61. The enlarged edge profile of fabric sheet 42 may be accomplished by folding the edge of fabric sheet 42 over a cylindrical rod 62, such as, for example, a hollow tube or other lightweight rod, and then sewing the overlapped portion 64 to the main portion of fabric sheet 42. When wall panel 30 is assembled, enlarged edge profile 61 is received in bore 56 of rails 44-47, with fabric sheet 42 extending through opening 58 in bore 56. Thus, fabric sheet 42 is secured at each edge within rails 44-47.

Figure 7:
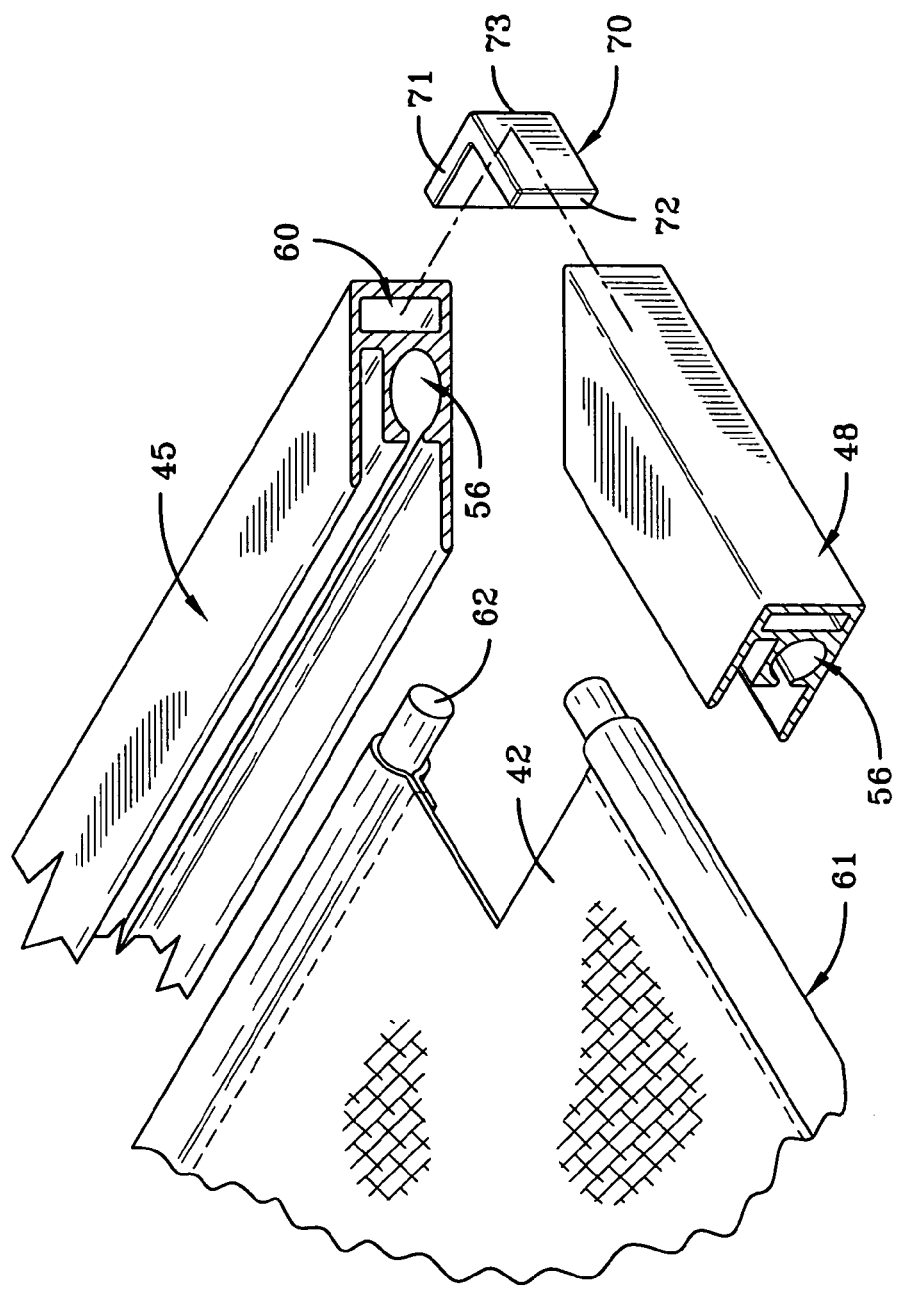
FIG. 7 is an exploded view of a corner of a wall panel according to the concepts of the present invention.

The rails of frame 40 are secured together at preferably up to three corners using a corner bracket 70. Corner bracket 70 has a first leg 71 and a second leg 72 that are connected at a corner 73 and are positioned substantially perpendicular to each other. Each leg 71, 72 of corner bracket 70 is received within a slot 60 in rails 44-47. As seen in FIG. 7, first leg 71 is received within slot 60 of top rail 45, and second leg 72 is received within slot 60 (not visible) of side rail 46. Although the embodiment shown in the figures and described herein utilizes a corner bracket 70 at three of the four corners of frame 40, it should be appreciated that a corner bracket may be provided at all four corners, as long as one of the corners is provided with a fastening assembly shown in FIG. 8 now to be described.

Figure 8:
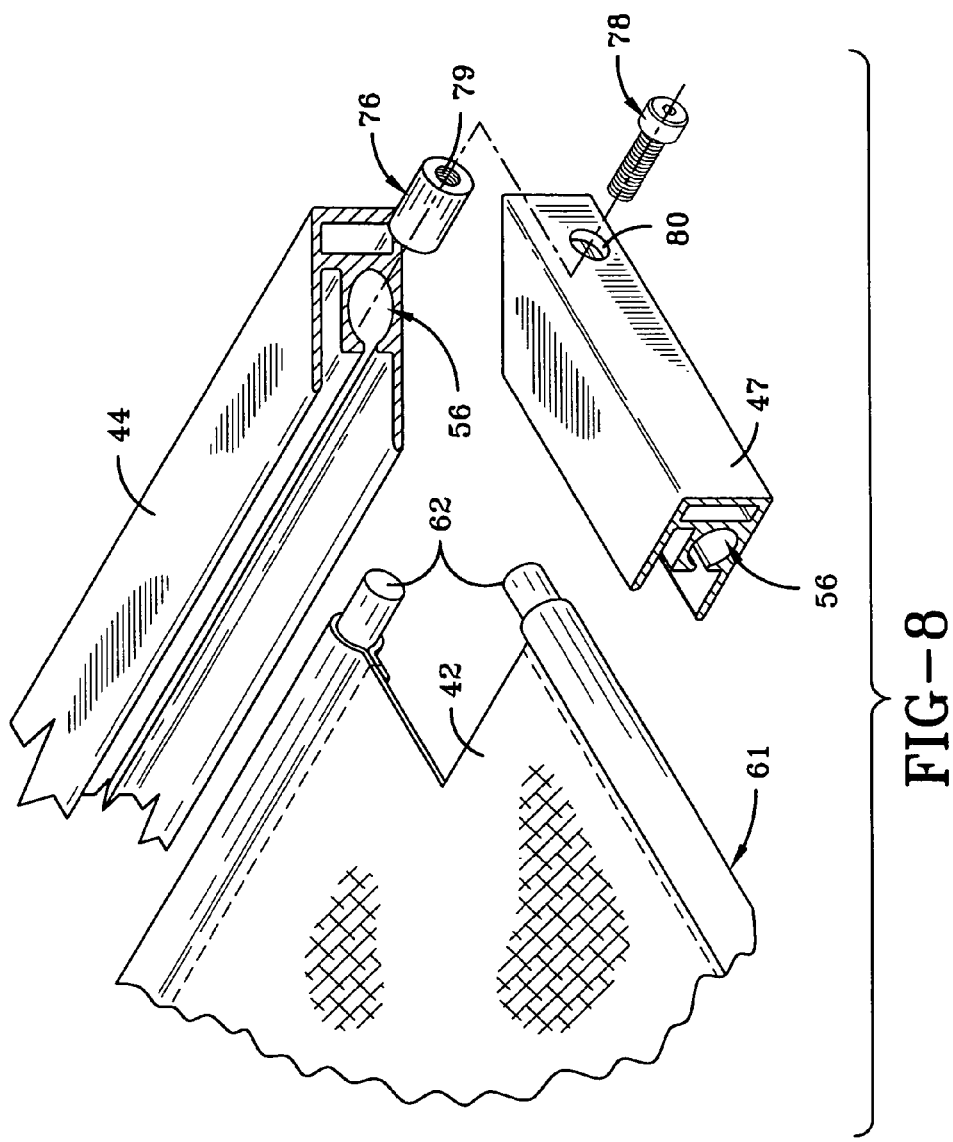
FIG. 8 is an exploded view of an alternate corner construction according to the concepts of the present invention.

Thus, at least one corner of frame 40 is assembled as shown in FIG. 8, with a threaded insert 76 and a threaded fastener 78. Threaded insert 76 is received within the end of bore 56, and may secured therein by any method known to those skilled in the art, such as, for example, press fitting or by means of an adhesive. Threaded insert 76 has a threaded bore 79 therein, the threaded bore being coaxial with insert 76. An aperture 80 is provided in base plate 50 of side rail 47, through which threaded fastener 78 is inserted and selectively secured within threaded bore 79. When assembling frame 40, threaded insert 76 is first positioned within the desired bore 56, and the enlarged edge profiles 61 of fabric sheet 42 are inserted into bores 56. Corner brackets 70 are positioned within at least three of the four corners of frame 40 and the angled edges of rails 44-47 are then abutted against one another. Threaded fastener 78 may then be inserted through aperture 80 and secured within threaded insert 76. In this way frame 40 is secured around fabric sheet 42 to create a lightweight wall panel 30. Although minor damage to fabric sheet 42 may be repairable, if extensive damage occurs, fabric sheet 42 may be replaced without requiring an entirely new wall panel 30.

In view of the foregoing, it should thus be evident that a flatbed trailer sidewall system having panels as described herein accomplishes the objects of the present invention and otherwise substantially improves the art.

What is claimed is:

1. A wall panel for use in a flatbed trailer sidewall system, the wall panel comprising a frame, said frame including a top rail, a bottom rail, and two opposed side rails, said rails intersecting with each other to create a generally rectangular shaped frame having four corners; and a waterproof fabric sheet; each said rail of said frame having a bore therein, and said fabric sheet having an enlarged edge profile secured in said bore.

2. The wall panel of claim 1, further comprising a slot in each said rail and a corner bracket securing said rails together in at least three of said corners, said corner brackets having a first leg and a second leg extending substantially perpendicular from one another.

3. The wall panel of claim 2, further comprising a threaded insert in at least one of said rails proximate said corner, and a threaded fastener extending through an aperture in an adjacent rail and secured in said insert.

4. The wall panel of claim 1, each of said rails having a base plate, a first arm extending generally orthogonally from said base plate, a second arm extending generally orthogonal from said base plate substantially parallel to said first arm, and a slot extending longitudinally within said rails.

5. The wall panel of claim 1, said rails being made of extruded aluminum.

6. A sidewall system for use on a flatbed trailer having pockets around the perimeter of the bed, the system comprising a plurality of stakes adapted to be positioned vertically in the pockets of the trailer bed, and wall panels adapted to be positioned between said stakes, said wall panels having a frame including a top rail, a bottom rail, and two opposed side rails, said rails intersecting with each other to create a generally rectangular shaped frame having four corners and a waterproof fabric sheet, each said rail of said frame having a bore therein, and said fabric sheet having an enlarged edge profile secured in said bore.

7. The sidewall system of claim 6, said frame of said wall panels being made of extruded aluminum rails.

8. The sidewall system of claim 6, said bore extending longitudinally through each of said rails.

9. The sidewall system of claim 8, said frame having four rails, each rail extending generally orthogonally from the adjacent rails at the corners of said frame, said rails having a slot therein and angled end surfaces adapted to mate with said angled edge surfaces of adjacent rails.

10. The sidewall system of claim 9, said frame rails being secured to one-another by at least one right-angled bracket in said slots at a corner of said frame, and by at least one fastener received in a threaded insert at a corner of said frame.

11. The sidewall system of claim 6, said stakes having a flat surface, a protruding element extending generally orthogonally to said flat surface, and a retaining flange.

12. The sidewall system of claim 11, wherein said flat surface, said protruding element, and said retaining flange define two slots, each slot adapted to receive an edge of one said wall panel.

13. The sidewall system of claim 12, further comprising a plurality of arched members and a roof tarpaulin supported by said arched members.

14. The sidewall system of claim 13, said stakes having a recess in a top end thereof, said recess adapted to receive an end of a said arched member therein.

* * * * *